(12) United States Patent
Seo et al.

(10) Patent No.: US 8,619,895 B2
(45) Date of Patent: Dec. 31, 2013

(54) APPARATUS AND METHOD FOR TRANSMITTING/RECEIVING BROADCAST DATA IN DIGITAL BROADCASTING SYSTEM

(75) Inventors: Jae-Hyun Seo, Daejeon (KR); Sung-Ik Park, Daejeon (KR); Ho-Min Eum, Daejeon (KR); Hyoung-Soo Lim, Daejeon (KR); Heung-Mook Kim, Daejeon (KR); Soo-In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 190 days.

(21) Appl. No.: 13/211,829

(22) Filed: Aug. 17, 2011

(65) Prior Publication Data
US 2012/0044419 A1   Feb. 23, 2012

(30) Foreign Application Priority Data

Aug. 18, 2010  (KR) .................. 10-2010-0079735
Jul. 1, 2011    (KR) .................. 10-2011-0065505

(51) Int. Cl.
*H04L 27/18* (2006.01)

(52) U.S. Cl.
USPC ........... 375/279; 375/264; 375/265; 375/273; 375/286; 375/295; 375/308; 375/316; 375/323; 455/91; 455/108; 455/130; 455/324; 714/751; 714/752; 348/465

(58) Field of Classification Search
USPC ......... 375/279, 264, 265, 273, 286, 295, 308, 375/316, 323; 455/91, 108, 130, 324; 714/751, 752; 348/465
See application file for complete search history.

(56) References Cited

U.S. PATENT DOCUMENTS 7,215,713 B2 *  5/2007  Walker et al. .................. 375/261
7,529,312 B2 *  5/2009  Chen ............................. 375/269

FOREIGN PATENT DOCUMENTS

WO   WO 2009113763 A1 *  9/2009  ............... H04L 1/02

OTHER PUBLICATIONS

Jae Hyun Seo et al., "Additional Data Transmission Scheme Using Extended Signal Constellation of ATSC Terrestrial DTV Systems", 2011 Winter Conference of Korea Information and Communications Society, Feb. 24, 2011.

* cited by examiner

*Primary Examiner* — Leon Flores

(57) ABSTRACT

Disclosed are a method and an apparatus for transmitting and receiving broadcast data in a digital broadcasting system. The method for transmitting and receiving broadcast data in a digital broadcasting system includes receiving the main data encoded with symbols having a plurality of levels; deciding whether levels of main data symbols encoded with symbols having the plurality of levels belong to a first group; and mapping the main data symbols to extended levels by using modulation values of the additional data if it is decided that the levels of the main data symbols belong to the first group.

18 Claims, 10 Drawing Sheets

APPARATUS AND METHOD FOR TRANSMITTING/RECEIVING BROADCAST DATA IN DIGITAL BROADCASTING SYSTEM

CROSS-REFERENCES TO RELATED APPLICATIONS

The present application claims priority of Korean Patent Application Nos. 10-2010-0079735 and 10-2011-0065505, filed on Aug. 18, 2010 and Jul. 1, 2011, respectively, which are incorporated herein by reference in their entireties.

BACKGROUND OF THE INVENTION

1. Field of the Invention

Exemplary embodiments relate to an apparatus and a method for transmitting/receiving broadcast data, and more particularly, to an apparatus and a method for transmitting/receiving broadcast data in a digital broadcasting system.

2. Description of Related Art

A digital TV transmission scheme based on the ATSC standard that is a terrestrial digital broadcasting system adopted in USA, Canada, Mexico, Korea, or the like, has been known as facilitating an implementation of a transceiver and having excellent economical efficiency. The transmission scheme, which is a single carrier amplitude modulation vestigial side-band (VSB) scheme, transmits high-quality video, audio, and auxiliary data at a single bandwidth of 6 MHz. The most significant feature of the transmission scheme is a modulation scheme. Similarly to the existing analog VSB scheme, the transmission scheme symbolizes digital signals to perform the VSB modulation and uses a 8-VSB modulation scheme in the case of terrestrial broadcasting.

FIGS. 1 and 2 illustrate block diagrams of a transmitting and receiving system in a digital broadcasting system based on the existing ATSC scheme.

FIG. 1 is a block diagram of a transmitting system in a digital broadcasting system in accordance with the related art. In order to transmit data in the transmitting system, a randomizer 110 first randomizes data and a Reed-Solomon encoder 120 performs Reed-Solomon encoding that attaches 20 RS addition bytes to each packet of randomized data. The Reed-Solomon encoded data are interleaved in an interleaver 130 and the interleaved data is trellis-encoded in a trellis encoder 140. The block diagram of FIG. 1 briefly illustrates transmitting devices. The signals output from the trellis encoder 140 are mapped to bit symbols, which are assumed to be 8-level symbols having level values of {−7, −5, −3, −1, +1, +3, +5, +7}. A multiplexer (MUX) 150 inserts data segment synchronization and data field synchronization in a data frame. The multiplexed data are input to a VSB modulator. The VSB modulator 160 receives a pilot and the 8-level trellis data including synchronization to perform the 8-VSB, wherein a sample rate of the VSB modulator 160 is 10.76 Msymbol/s. The signals modulated as described above are output through a transmitting antenna 170.

FIG. 2 is a block diagram of a receiving system in the existing digital broadcasting system. As illustrated in the block diagram, components for demodulating and decoding received signals in the receiving system correspond to each component of the transmitting system. First, when the signals are received through the receiving antenna 270, the VSB demodulator 260 demodulates the modulated signals by the VSB scheme. Next, an equalizer 250 removes an influence of a multi-path channel through which the broadcast signals passes, thereby reducing inter-symbol interference. The signals passing through the equalizer are recovered into an original data form by passing through a trellis decoder 240, a deinterleaver 230, a Reed-Solomon decoder 220, and a derandomizer 210.

The ATSC scheme has high noise margin characteristics to stably provide services and has very high robustness against impulse noises by performing RS encoding and interleaver processes. However, a terrestrial digital broadcasting system adopted in Europe (DVB-T) or Japan (ISDB-T) may selectively apply various transmission capacities, if necessary. On the other hand, in the ATSC scheme, the transmission capacity is fixed. Therefore, a need exists for a technology development of increasing transmission efficiency while maintaining backward compatibility with the existing scheme so as to use the advantages of the ATSC scheme.

SUMMARY OF THE INVENTION

An embodiment of the present invention is directed to secure additional transmission capacity while maintaining backward compatibility with an ATSC scheme that is a terrestrial digital broadcasting system of the related art.

Another embodiment of the present invention is directed to provide new broadcast services using additional data by establishing a transmission scheme of additional data to be added, independently from an ATSC standard.

The objects of the present invention are not limited to the above-mentioned objects and therefore, other objects and advantages of the present invention that are not mentioned may be understood by the following description and will be more obviously understood by exemplary embodiments of the present invention. In addition, it can be easily appreciated that objects and advantages of the present invention may be implemented by means and a combination thereof described in claims.

In accordance with an embodiment of the present invention, a method for transmitting broadcast data including main data and additional data in a digital broadcasting system includes: receiving the main data encoded with symbols having a plurality of levels; deciding whether levels of main data symbols encoded with symbols having the plurality of levels belong to a first group; and mapping the main data symbols to extended levels by using modulation values of the additional data if it is decided that the levels of the main data symbols belong to the first group.

In accordance with another embodiment of the present invention, a method for receiving broadcast data including main data and additional data in a digital broadcasting system includes: receiving the broadcast data encoded with symbols having a plurality of levels including extended levels; deciding whether levels of broadcast data symbols including the extended levels belong to a fifth group; and outputting the broadcast data symbol to a decoder of the main data and outputting modulation values of the additional data using the extended levels of the broadcast data symbols, if it is decided that the levels of the broadcast data symbols belong to the fifth group.

In accordance with another embodiment of the present invention, an apparatus for transmitting broadcast data including main data and additional data in a digital broadcasting system includes: detector deciding whether levels of the main data symbols encoded with symbols having a plurality of levels belong to a first group; and a mapper mapping the main data symbols to extended levels by using the modulation values of the additional data if it is decided that the symbols of the main data belong to a first group.

In accordance with another embodiment of the present invention, an apparatus for receiving broadcast data including main data and additional data in a digital broadcasting system includes: a detector deciding whether levels of the broadcast data symbols encoded with symbols having a plurality of levels including extended levels belong to a fifth group; and a demapper outputting the broadcast data symbols to a decoder of the main data and outputting the modulation values of the additional data by using extended levels of the broadcast data symbols if it is decided that the symbols of the broadcast data belong to the fifth group.

DESCRIPTION OF SPECIFIC EMBODIMENTS

Exemplary embodiments of the present invention will be described below in more detail with reference to the accompanying drawings. Only portions needed to understand an operation in accordance with exemplary embodiments of the present invention will be described in the following description. It is to be noted that descriptions of other portions will be omitted so as not to make the subject matters of the present invention obscure.

Hereinafter, an apparatus for transmitting broadcast data including main data and additional data in a digital broadcasting system will be described with reference to FIGS. 3 and 4.

Figure 1:
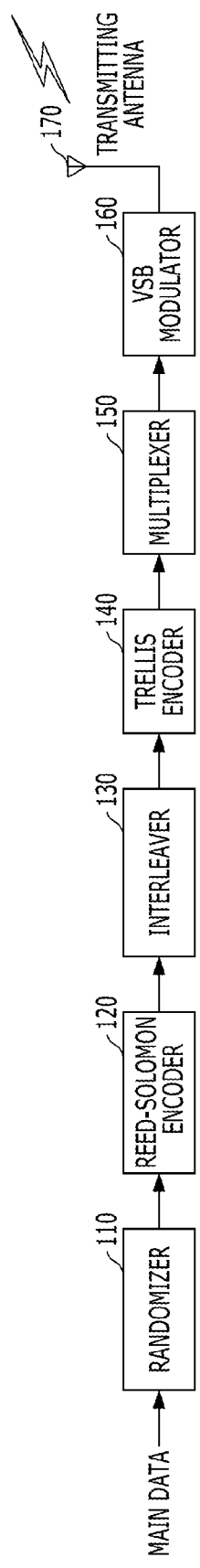
FIG. 1 is a block diagram of a transmitting system in the existing digital broadcasting system.
Figure 2:
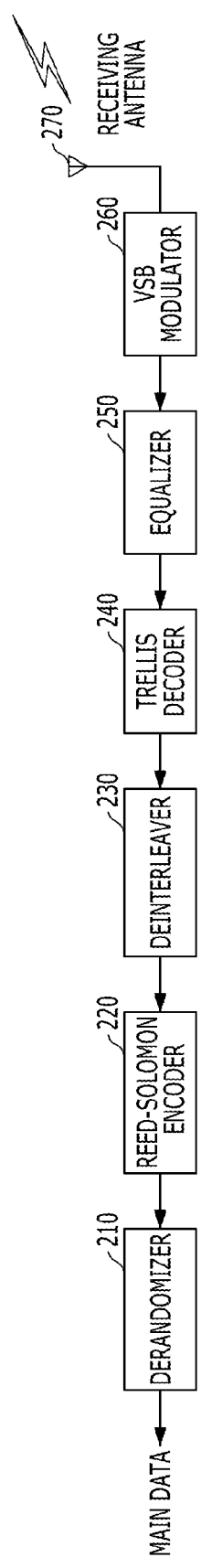
FIG. 2 is a block diagram of a receiving system in a digital broadcasting system in accordance with the related art.
Figure 3:
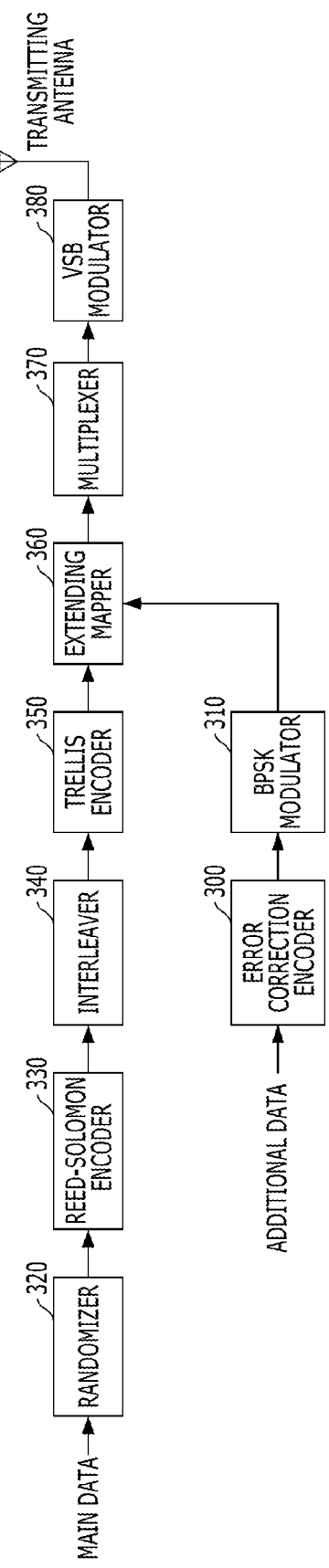
FIG. 3 is a block diagram of a transmitting system including an apparatus for transmitting broadcast data in a digital broadcasting system in accordance with an exemplary embodiment of the present invention.

FIG. 3 is a block diagram of a transmitting system including an apparatus for transmitting broadcast data in a digital broadcasting system in accordance with an exemplary embodiment of the present invention.

As illustrated in FIG. 3, the transmitting system includes a randomizer 320, a Reed-Solomon encoder 330, an interleaver 340, a trellis encoder 350, a multiplexer 370, a VSB modulator 380, and a transmitting antenna 390 and further includes an error correction encoder 300, a BPSK modulator 310, and an extending mapper 360 so as to transmit additional data.

The main data are encoded through the randomizer 320, the Reed-Solomon encoder 330, the interleaver 340, and the trellis encoder 350 by the same manner as the related art. In this case, the main data passing through the trellis encoder 350 may have 8-level symbols form mapped to one value of $\{-7, -5, -3, -1, +1, +3, +5, +7\}$.

In addition, the additional data to be additionally transmitted is subjected to error correction encoding via an error correction encoder 300. In this case, as the error correction encoder, the encoders having excellent error correction capability such as turbo code, low-density parity-check code (LDPC), or the like, may be used. The error correction encoding, which is to reduce errors during a transmission process, converts signals so as for a receiving side to detect and correct the errors during transmission of information through a channel.

In accordance with the exemplary embodiment of the present invention, the signal that is subjected to the error correction encoding may be BPSK-modulated through the BPSK modulator 310. The BPSK modulator, which is referred to as binary phase shift keying, transmits 1 bit to one symbol, such that the output from the BPSK modulator may be a symbol having a modulation value of +1 or −1.

The main data symbols encoded with the symbols having 8 levels and the additional data symbols subjected to the BPSK modulation are input to the extending mapper 360 and the extending mapper 360 again maps the symbols to the extended levels, thereby transmitting the broadcast data including the additional data and the main data while maintaining the backward compatibility with the existing system.

The broadcast data output from the extending mapper 360, that is, data configured of the symbols having 10 levels including the main data and the additional data passes through the multiplexer 370 inserting the data segment synchronization and the data field synchronization and are input to the VSB modulator 380. The broadcast data modulated by the VSB scheme are subjected to analog signal processing, which is in turn transmitted through the transmitting antenna 390.

Figure 4:
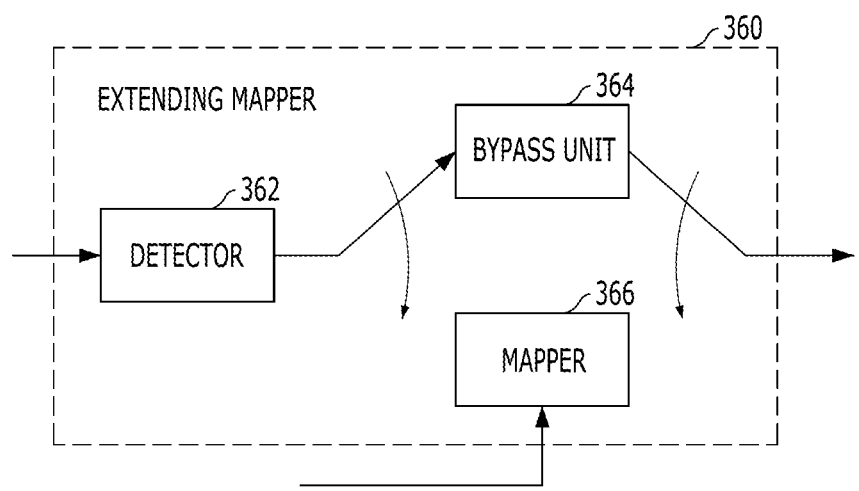
FIG. 4 is a detailed configuration diagram of an extending mapper in the apparatus for transmitting broadcast data in accordance with the exemplary embodiment of the present invention.

FIG. 4 is a detailed configuration diagram of the extending mapper in the apparatus for transmitting broadcast data in accordance with the exemplary embodiment of the present invention.

Referring to FIG. 4, the extending mapper 360 includes a detector 362 and a mapper 366 and may further include a bypass unit 364.

The detector 362 detects symbols having level values of $\{-7, +7\}$ among the main data symbols having 8 levels that are input from the trellis encoder 350. That is, it is decided whether the levels belong to a {−7, +7} group. The decision is performed using the decision level. When the level values are {−7, −5, −3, −1, +1, +3, +5, +7}, the decision levels have 7 values of {−6, −4, −2, 0, +2, +4, +6} and the detector 362 uses −6 and +6 decision levels so as to decide whether the symbol levels belong to the {−7, +7} group. That is, when the symbol level value is S, the detector 362 decides that the main data symbol S belongs to the {−7, +7} group if |S|<6, thereby inputting the main data symbols to the mapper 366. If |S|>6, the detector 362 decides that S belongs to a {−5, −3, −1, +1, +3, +5} group and therefore, inputs the main data symbols to the bypass unit 364.

The bypass unit 364 maintains the levels of the main data symbols as they are and therefore, the symbols passing through the bypass unit 364 have the level values as they are.

The mapper 366 receives the main data symbols having −7 or +7 level values from the detector 362 and receives the additional data symbols having +1 or −1 level values from the BPSK modulator 310. The mapper 366 uses the additional data symbol values, that is, the BPSK modulation values to again map the main data symbols having −7 or +7 level values to −D or +D that are extended levels. For example, when the BPSK modulation value is +1, the mapper maps +/−7 to +/−7 as it is and when the BPSK modulation value is −1, the mapper maps +/−7 to +/−D. In other words, the mapper 366 divides the modulation values into two groups and decides whether the main data symbols input to the mapper 366 are mapped to the extended levels according to whether the modulation values belong to any group, such that some of the main data symbols are again mapped to the extended levels and the rest are maintained to an original level as they are.

As a result, the data symbol values output from the mapper 366 have the level values of {−D, −7, +7, +D} and therefore, the output from the extending mapper 360 including the bypass unit 364 or the mapper 366 is {−D, −7, −5, −3, −1, +1, +3, +5, +7, +D}, such that the symbols of the transmitted broadcast data have 10 levels. The symbols of the broadcast data transmitted as described above have 10 levels, such that 1-bit additional transmission per a specific symbol may be performed, as compared with the existing symbol mapping. If the probability of generating +/−7-level symbol is 25% in the existing symbol of 8 levels, the digital broadcasting system may secure the additional transmission capacity of about 2.6 Mbps through the additional mapping to the extended levels.

Hereinafter, an apparatus for transmitting broadcast data including the main data and the additional data in the digital broadcasting system will be described with reference to FIGS. 5 and 6.

Figure 5:
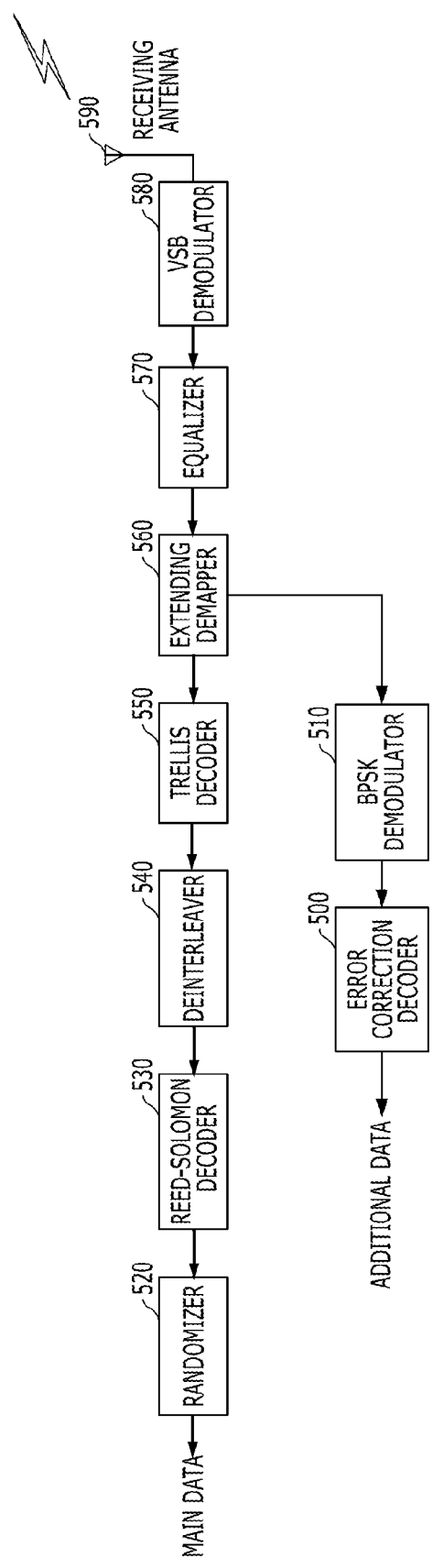
FIG. 5 is a block diagram of a receiving system including an apparatus for receiving broadcast data in the digital broadcasting system in accordance with an exemplary embodiment of the present invention.

FIG. 5 is a block diagram of a receiving system including an apparatus for receiving broadcast data in the digital broadcasting system in accordance with an exemplary embodiment of the present invention.

As illustrated in FIG. 5, the receiving system includes a reveres randomizer 520, a Reed-Solomon decoder 530, a deinterleaver 540, a trellis decoder 550, an equalizer 550, a VSB demodulator 580, and a receiving antenna 590 and further includes an error correction decoder 500, a BPSK demodulator 510, and an extending demapper 560 so as to recover additional data.

The broadcast data including the main data and the additional data received through the receiving antenna 590 are converted into the digital signals through a tuner, or the like, and are demodulated by the VSB scheme in the VSB demodulator 580. The demodulated signals pass through the equalizer 570 that removes the influence of the multi-path channel and the 10-level symbols input to the extending demapper 560 are demapped to the main data symbols configured of 8 levels and the additional data symbols configured of 2 levels.

In this case, the main data symbols configured of 8 levels pass through the trellis decoder 550, the deinterleaver 540, the Reed-Solomon decoder 530, and the derandomizer 520 as the same scheme as the related art and are recovered to the original main data form.

In addition, the addition data symbols configured of levels are input to the BPSK demodulator 510 and are demodulated into binary data and are subjected to the error correction decoding in the error correction decoder 500 so as to be recovered to the original additional data form to be transmitted. Similarly to the transmitting system, the decoders having the excellent error correction capability such as the turbo code, the low-density parity-check code (LDPC) may be used for the error correction decoding.

Figure 6:
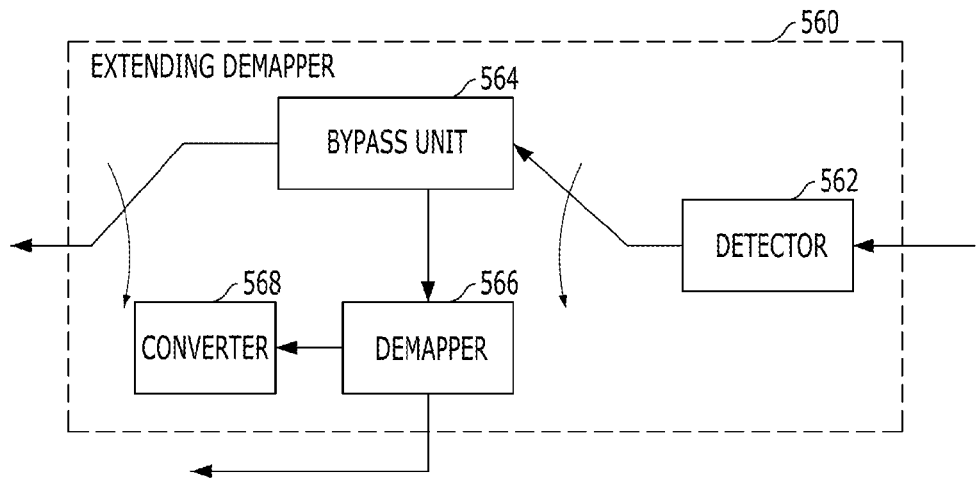
FIG. 6 is a detailed configuration diagram of an extending demapper in the apparatus for receiving broadcast data in accordance with the exemplary embodiment of the present invention.

FIG. 6 is a detailed configuration diagram of an extending demapper in the apparatus for receiving broadcast data in accordance with the exemplary embodiment of the present invention.

Referring to FIG. 6, the extending demapper 560 includes a detector 562 and a demapper 566 and may further include a bypass unit 564 and a converter 568.

The detector 562 detects the output symbol of the equalizer 570, that is, the symbols having the level values of {−D, −7, +7, +D} among the broadcast data symbols having 10 levels including the main data and the additional data. That is, it is decides whether the level belongs to a {−D, −7, +7, +D} group. The decision is also performed using the decision level. When the level values are {−D, −7, −5, −3, −1, +1, +3, +5, +7, +D}, the decision level has 9 values of {−c, −6, −4, −2, 0, +2, +4, +6, +c} and the detector 562 uses −6 and +6 decision levels so as to decide whether the symbol levels belong to the {−D, −7, +7, +D} group. That is, when the symbol level value is S, the detector 562 decides that the broadcast data symbols belong to the {−D, −7, +7, +D} group if |S|>6, thereby inputting the broadcast data symbol to the demapper 566. If |S|<6, the detector 362 decides that the broadcast data symbols belong to a {−5, −3, −1, +1, +3, +5} group and therefore, inputs the broadcast data symbol to the bypass unit 564.

The bypass unit 564 maintains the levels of the broadcast data symbols as they are and therefore, the symbols passing through the bypass unit 564 have the level values as they are.

The demapper 566 processes the broadcast data symbol so as to maintain the backward compatibility with the existing system. The broadcast data symbols input to the demapper 566 are {−D, −7, +7, +D}. The processing of the demapper 566 outputting the BPSK modulation values to the BPSK demodulator 510 using the symbols mapped to the extending levels (−D, +D) is as follows.

The demapper 566 uses the decision level to decide whether the levels of the broadcast data symbols belong to any group. The decision levels used in the demapper 566 are −c or +c. In this case, +/−c is an added decision level and serves to differentiate +/−7 and +/−D and has a range of 7<|c|<D. When the symbol level value is S, the broadcast data symbols belong to the {−7, +7} group if |S|<c and thus, the demapper 566 outputs +1 as the BPSK modulation values and the broadcast data symbols belong to the {−D, +D} group if |S|>c and therefore, the demapper 566 outputs −1 as the BPSK modulation values. This is only the exemplary embodiment and the output BPSK modulation values may be set so as to be equal to the values set in the transmitting system. The BPSK modulation values output from the demapper 566 are 2-level addition data symbols, which are recovered to the additional data via the BPSK modulator 510 and the error correction decoder 500 as described above.

Separately from the values output to the BPSK demodulator 510, the demapper inputs the broadcast data symbols having the levels of {−D, −7, +7, +D} to the trellis decoder 550 as they are. The trellis decoder recognizes −D and −7 as the symbols all having −7 level and recognizes +D and +7 as the symbols all having +7. Therefore, differently from the case in which the extending mapper 360 of the transmitting system maps {−7, +7} main data symbols to the extending symbols, the symbols mapped to the extending levels are recognized as the original symbol values and subjected to the decoding process. Therefore, the trellis decoder 550 is the same as receiving the main data symbols having 8 levels as the output value of the extending demapper 560. Consequently, the main data symbols passing through the trellis decoder 550 are recovered to the main data through the same decoding process as the existing receiving system.

As another exemplary embodiment of the present invention, the extending demapper 560 may include the converter 568. As described above, the trellis decoder recognizes the symbol level as +/−7 if |S|>6, the trellis decoder may selectively include the converter 568. The converter 568 passes the broadcast data symbols belonging to the {−7, +7} group through the demapper as they are and converts and transmits the broadcast data symbols belonging to the {−D, +D} group into {−7, +7} having a smaller level value of two groups. Therefore, the broadcast data symbol levels passing through the converter are −7 or +7, which is a maximum value of the 8-level main data symbol. As a result, the output from the extending demapper 560 is the 8-level main data symbol that is input to the trellis decoder 550 and the 2-level main data symbol input to the BPSK demodulator 510. A process of recovering each data symbol to the main data and the additional data is the same as one described above.

Figure 7:
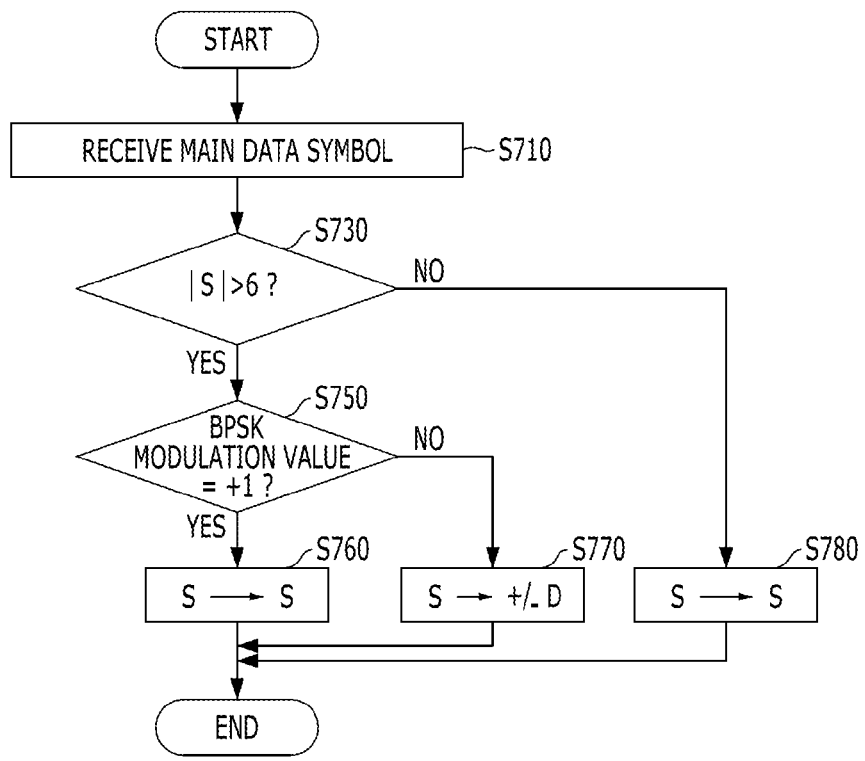
FIG. 7 is a flow chart of a process of mapping main data symbols and additional data symbols to extended levels by the method for transmitting broadcast data in the digital broadcasting system in accordance with the exemplary embodiment of the present invention.

FIG. 7 is a flow chart of a process of mapping the main data symbols and the additional data symbols to the extended levels by the method for transmitting broadcast data in the digital broadcasting system in accordance with the exemplary embodiment of the present invention.

Referring to FIG. 7, the method first receives the main data symbols encoded with the symbols having 8 levels (S710) and decides whether the absolute value (|S|) of the main data symbol level is larger than 6 (S730). As the decision result, if |S|>6, since the symbol level belongs to the {−7, +7} group, the method again decides whether the BPSK modulation value of the input additional data is +1 (S760) to maintain the symbol level when the BPSK modulation value is +1 as it is (S760) and maps the symbol level to the extended level, that is, −D or +D value when the BPSK modulation value is −1 (S770). As the decision result at step (S730), if |S|<6, the symbol level belongs to the {−5, −3, −1, +1, +3, +5} group and therefore, the symbol level is maintained (S780) as it is. Although not illustrated, the BPSK modulation value is the additional data symbol value generated by performing the error correction encoding on the additional data and performing the BPSK modulation on the error correction encoded signal.

Figure 8:
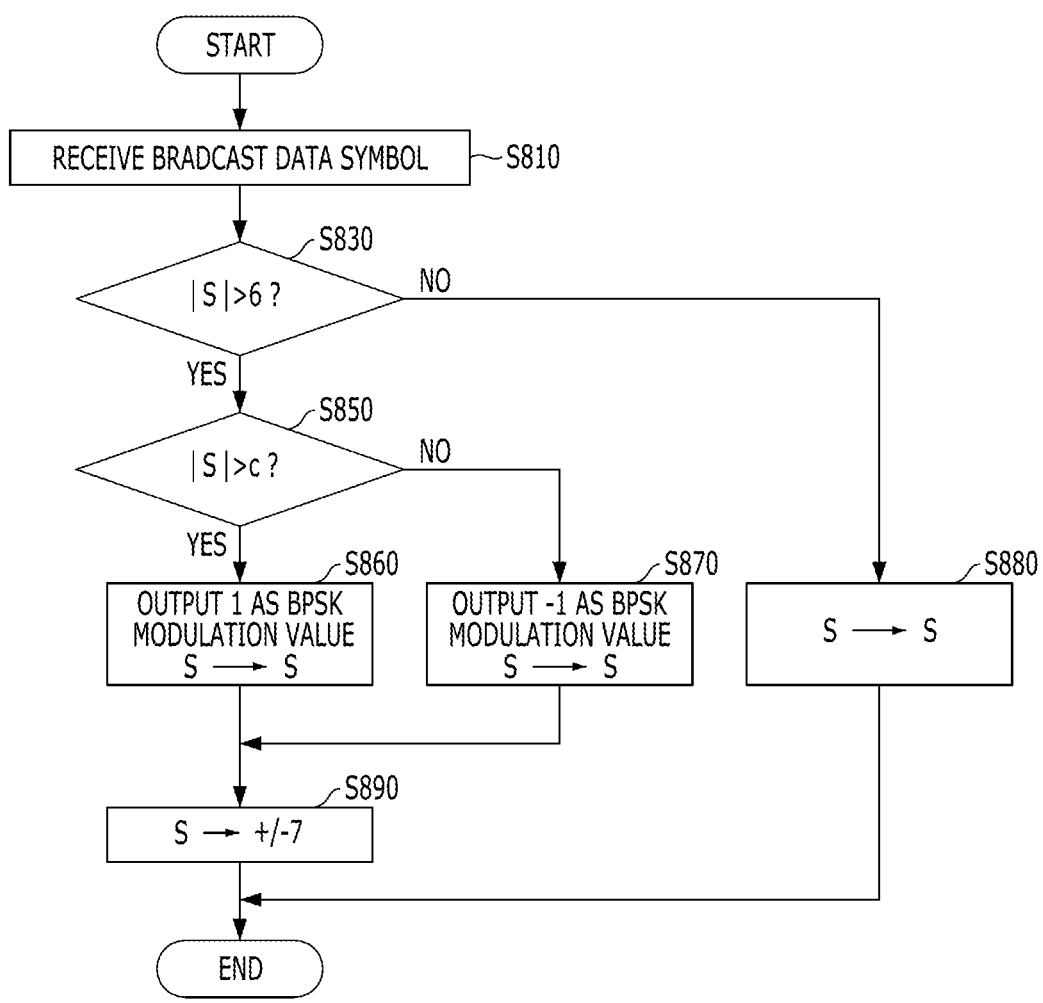
FIG. 8 is a flow chart of a process of demapping the broadcast data symbols mapped to the extended levels to the main data symbols and the additional data symbols by the method for receiving broadcast data in the digital broadcasting system in accordance with the exemplary embodiment of the present invention.

FIG. 8 is a flow chart of a process of demapping the broadcast data symbols mapped to the extended levels to the main data symbols and the additional data symbols by the method for receiving broadcast data in the digital broadcasting system in accordance with the exemplary embodiment of the present invention.

Referring to FIG. 8, the method first receives the broadcast data encoded with the symbols having 10 levels (S810) including the extended level and decides whether the absolute value (|S|) of the broadcast data symbol level is larger than 6 (S830). As the decision result, if |S|>6, the symbol level belongs to the {−D, −7, +7, +D} group and therefore, the method again decides whether the symbol level belongs to the {−D, +D} group that is the symbol level by using the added decision level c and the symbol level belongs to the {−7, +7} group. As the decision result (S830), if |S|<6, the symbol level is maintained as it is (S780).

At the step of deciding the symbol level value using the added decision level c (S850), if |S|>c, the BPSK modulation value is output as +1 while the symbol level value is maintained as it is (s860) and if |S|<c, the BPSK modulation value is output as −1 while the symbol level value is maintained as it is (S870). The BPSK modulation signal output at the above steps S860 and S870 is the additional data symbol and then, is subjected to the BPSK demodulation and the error correction decoding so as to be recovered to the additional data. In addition, the groups {7 +7} and {−D, +D} decided that the absolute value is larger than the decision level 6 may be converted and output into the level of the group having the smaller absolute value among two groups, that is, +/−7 (S890). In other words, +/−7 maintains the symbol levels as it is or +/−D is converted into +/−7.

Figure 9:
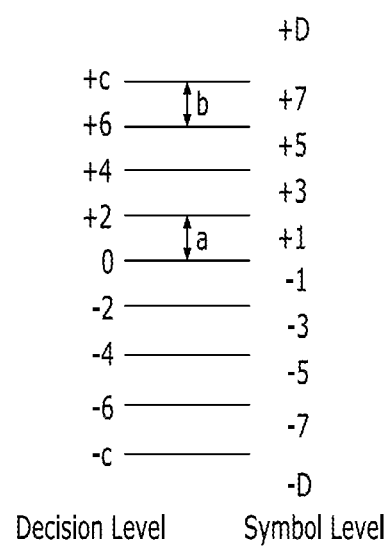
FIG. 9 is a diagram for describing in detail a relationship between a symbol level and a decision level in the digital broadcasting system in accordance with the exemplary embodiment of the present invention.

FIG. 9 is a diagram for describing in detail a relationship between a symbol level and a decision level in the digital broadcasting system in accordance with the exemplary embodiment of the present invention.

Referring to FIG. 9, the case of the data symbol of the existing digital broadcasting has 7 decision levels of {−6, −4, −2, 0, +2, +4, +6}. In this case, in order to map the main data symbols to the extended levels for the additional data transmission, two decision levels of −c and +c of which the absolute value is larger than 6 are added. When an interval between the existing decision levels is set to be a and an interval between the maximum value +6 of the existing decision level and the added decision level +c is set to be b, a ratio of value a and value b may be represented by the following Equation.

$$\alpha = \frac{b}{a} \qquad \text{[Equation 1]}$$

Herein, if value b is set so that value a is smaller than 1, the existing system, that is, the influence on the data transmission and reception is reduced and the transmitting and receiving performance of the additional data to be added is degraded. To the contrary, if value b is set so that value a is larger than 1, the influence on the existing system is increased but the transmitting and receiving performance of the additional data to be added is improved. That is, at the time of transmitting the additional data while maintaining the compatibility with the existing system, the transmitting and receiving performance of the additional data and the transmitting and receiving performance of the main data in the existing system have a trade off relationship therebetween.

Figure 10:
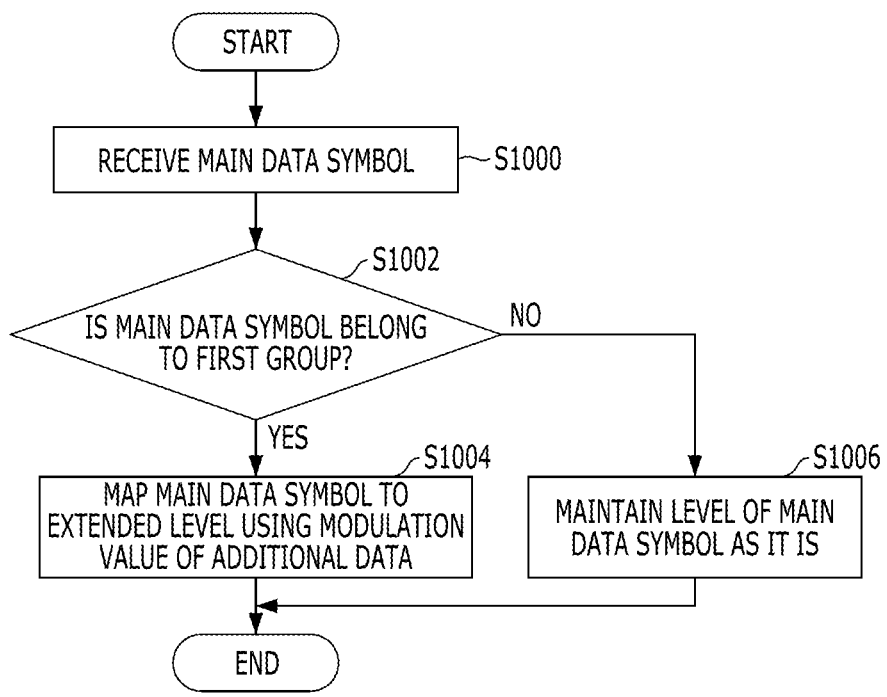
FIG. 10 is a flow chart for describing the method for transmitting broadcast data in the digital broadcasting system in accordance with the exemplary embodiment of the present invention.

FIG. 10 is a flow chart for describing the method for transmitting broadcast data in the digital broadcasting system in accordance with the exemplary embodiment of the present invention.

Referring to FIG. 10, the method receives the main data symbols (S1000) and decides whether the main data symbols belong to the first group (S1002). As the decision result, if it is decided that the levels of the main data symbols belong to the first group, the main data symbols are mapped to the extended levels by using the modulation values of the additional data (S1004). As the decision result, if it is decided that the main data symbols do not belong to the first group, it is considered that the main data symbols belong to the second group. Therefore, the levels of the main data symbols are maintained as they are (S1006).

The step of deciding whether the main data symbols belong to the first group (S1002) is performed using the decision level. The decision level is a level that is referenced for deciding the level value and is classified into the first group and the second group based on the decision level. In accordance with the exemplary embodiment of the present invention, the first group is a group configured of the symbol level larger than the maximum value of the decision level and the symbol level smaller than the minimum value of the decision level. For example, when the decision level is {−6, −4, −2, −0, +2, +4, +6}, the first group is {−7, +7} configured of 7 larger than the maximum value 6 of the decision level and −7 smaller than the minimum value −6 of the decision level. The symbol level that does not belong to the first group corresponds to the second group and therefore, the second group has a level value of {−5, −3, −1, +1, +3, +5} according to the above example.

When the main data symbol belongs to the first group, the main data symbol is mapped to the extended level by using the modulation values of the additional data (S1004), such that a larger amount of information by the number of increased symbol levels may be transmitted. When the main data symbol belongs to the second group, the levels of the main data symbols are maintained as they are (S1006). In accordance with the exemplary embodiment, only the maximum level and the minimum level of the main data symbols are an object mapped to the extended levels according to the modulation values of the additional data.

Although not illustrated, the modulation values of the additional data used for the extended level mapping may be the 2-level additional data symbol generated by performing the error correction encoding and the BPSK modulation on the additional data.

Figure 11:
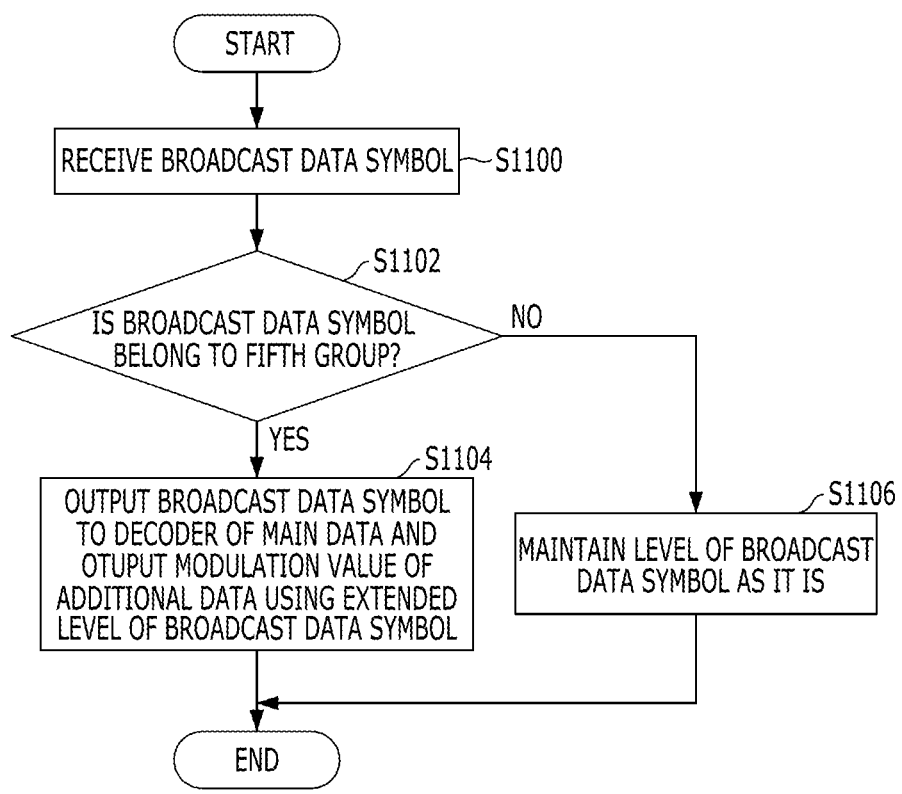
FIG. 11 is a flow chart for describing the method for receiving broadcast data in the digital broadcasting system in accordance with the exemplary embodiment of the present invention.

FIG. 11 is a flow chart for describing the method for receiving broadcast data in the digital broadcasting system in accordance with the exemplary embodiment of the present invention.

Referring to FIG. 11, the method first receives the broadcast data symbols (S1100) and decides whether the broadcast data symbols belong to a fifth group (S1102). As the decision result, when the broadcast data symbols belong to the fifth group, the broadcast data symbols are output to the decoder of the main data and the modulation values of the additional data are output by using the extended levels of the broadcast data symbols (S1104). As the decision result, if it is decided that the broadcast data symbols do not belong to the fifth group, it is considered that the broadcast data symbols belong to the sixth group. Therefore, the levels of the broadcast data symbols are maintained as they are (S1106).

In this case, the input broadcast data symbols are the symbols having the levels including the extended levels and include both of the main data and the additional data. Therefore, in order to secure the backward compatibility with the existing system, a need exists for a process of demapping the broadcast data symbols mapped to the extended levels to the main data symbols and the additional data symbols before the decoding process.

The decision on whether the broadcast data symbols belong to the fifth group (S1102) is performed using the same decision level at the time of transmitting and the rest levels that do not belong to the fifth group among the broadcast data symbol levels belong to the sixth group. The fifth group includes the level used for the extended level mapping among the broadcast data symbols and the extended level. For example, when the main data symbols −7 and +7 are used for the extended level mapping at the time of transmitting and are each mapped to −D and +D, the fifth group is {−D, −7, +7, +D} and the sixth group is {−5, −3, −1, +1, +3, +5}.

If it is decided that the broadcast data symbols belong to the fifth group, the broadcast data symbols are output to the decoder of the main data (S1104). In addition, differently therefrom, the modulation values of the additional data are output by using the extended levels of the broadcast data symbols (S1104). The broadcast data symbols input to the decoder of the main data includes the extended levels but the decoder of the main data recognizes the values above the maximum values of the decision levels as the maximum level of both of the main data symbols and therefore, performs the normal decoding.

Although not illustrated, in accordance with the exemplary embodiment of the present invention, before the broadcast data symbols are output to the decoder of the main data, a step of converting the levels of the broadcast data symbols into any one of a seventh group or an eighth group may be added. The seventh group and the eighth group are divided into the extended level among the symbol levels of the fifth group and the symbol level other than the extended levels. For example, if the seventh group is {−D, +D} that are the extended level group, the eighth group is {−7, +7}. The above step is selective, which converts the extended levels into the level used for the extended level mapping. That is, in the above example, the original level of the main data is input by converting +/−D into +/−7.

In addition, although not illustrated, in accordance with the exemplary embodiment of the present invention, the modulation values of the additional data to be output may be the BPSK signal and the BPSK signal may be subjected to the BPSK modulation and the error correction decoding so as to be recovered to the additional data.

Figure 12:
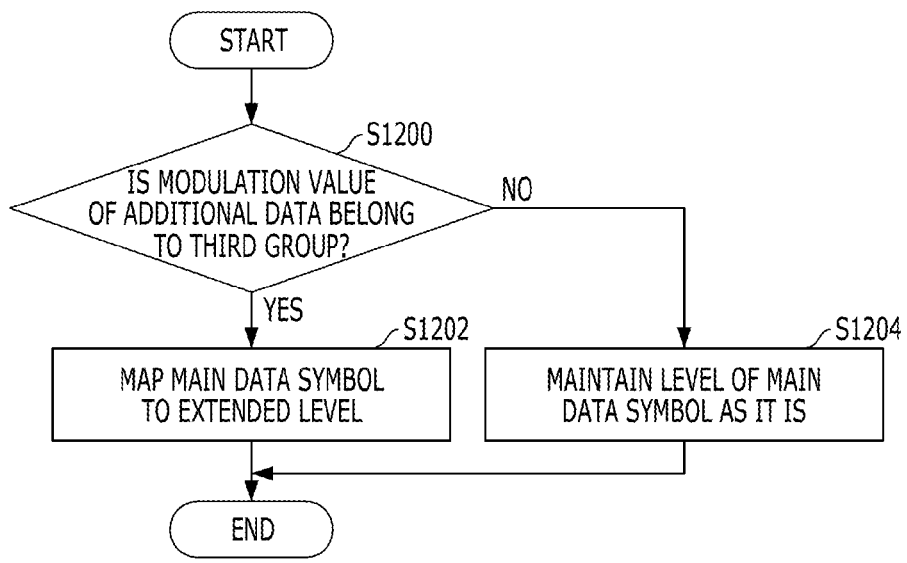
FIG. 12 is a flow chart for describing in detail a process of mapping the main data symbols to the extended levels by the method for transmitting broadcast data in the digital broadcasting system in accordance with the exemplary embodiment of the present invention.

FIG. 12 is a flow chart for describing in detail a process of mapping the main data symbols to the extended levels by the method for transmitting broadcast data in the digital broadcasting system in accordance with the exemplary embodiment of the present invention.

Referring to FIG. 12, it is decided that the modulation values of the additional data belong to the third group (S1200). When the modulation values of the additional data do not belong to the third group, it is considered that the modulation values of the additional data belong to the fourth group. When the modulation values of the additional data belong to the third group, the main data symbols are mapped to the extended levels (S1202) and when the modulation values of the additional data belong to the fourth group, the levels of the main data symbols are maintained as they are (S1204). For example, when the modulation values of the additional data are 2-level symbols and {−1, 1}, the third group may be set to be −1 and the fourth group may be set to be 1. In this case, when the additional data modulation value is set to be −1, −7 of the main data symbols belonging to the first group is mapped to −D that is the extended level and +7 is mapped to +D. When the additional data modulation value is +1, the original values of −7 and +7 are maintained as they are. Therefore, the number of symbol levels of all the broadcast data including data and additional data is increased by the number of extended levels in the number of symbol levels of the main data.

Figure 13:
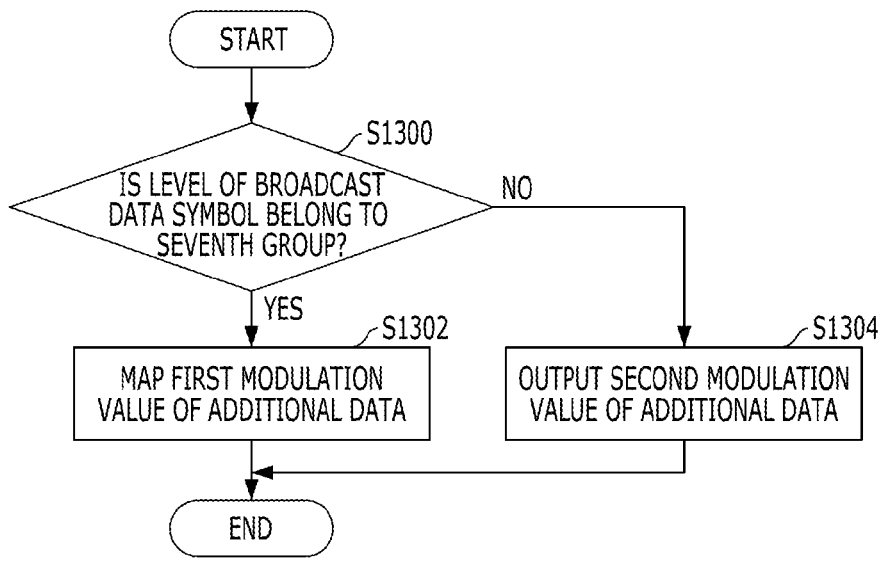
FIG. 13 is a flow chart for describing in detail a process of outputting modulation values of additional data by the method for receiving broadcast data in the digital broadcasting system in accordance with the exemplary embodiment of the present invention.

FIG. 13 is a flow chart for describing in detail a process of outputting modulation values of additional data by the method for receiving broadcast data in the digital broadcasting system in accordance with the exemplary embodiment of the present invention.

Referring to FIG. 13, the method determines whether the levels of the broadcast data symbols first belong to the seventh group (S1300). When the levels of the broadcast data symbols do not belong to the seventh group, it is considered that the levels of the broadcast data symbols belong to the eighth group. When the levels of the broadcast data symbols belong to the seventh group, when a first modulation value of the additional data is output (S1302) and the levels of the broadcast data symbols belong to the eighth group, the second modulation value of the additional data is output (S1304).

The seventh group and the eighth group are divided into the extended level as described in FIG. 9 and the symbol level other the extended level. Therefore, the first modulation value corresponds to the third group of the additional data modulation value at the transmitting step and the second modulation value corresponds to the fourth group of the additional data modulation value. For example, when the modulation value of the addition data is −1 at the transmitting step, if the main data symbol +/−7 is mapped to +/−D that is the extended level and therefore, at the receiving step, the main data symbol is mapped to +/−D that is the extended level, the modulation value of the additional data is output as −1.

The configuration of the present invention as described above can secure the additional transmission capacity while maintaining the backward compatibility with the ATSC that is the digital broadcasting system in accordance with the related art by mapping the symbol level of the main data to the extended level using the symbols of the additional data.

In addition, the transmission scheme of the additional data to be added in accordance with the exemplary embodiment of the present invention may be independent from the ATSC standard and additionally provide the new broadcast services by using the additional data.

While the present invention has been described with respect to the specific embodiments, it will be apparent to those skilled in the art that various changes and modifications may be made without departing from the spirit and scope of the invention. Accordingly, the scope of the invention is not limited to exemplary embodiments as described above and is defined by the following claims and equivalents to the scope the claims.

What is claimed is:

1. A method for transmitting broadcast data including main data and additional data in a digital broadcasting system, comprising:
    receiving a main data encoded with symbols having a plurality of levels;
    detecting a first portion of the main data encoded with symbols having bypass levels;
    mapping a second portion of the main data to extended levels, wherein the mapping includes
        receiving an additional data having modulated values, and
        mapping the second portion of the main data symbols to extended levels by applying modulation values of the additional data; and
    combining the first portion of the main data, the second portion of the main data including data mapped to extended levels, and the additional data for broadcast through a transmitting antenna,
    wherein the additional data and the main data retain backward compatibility.

2. The method of claim 1, wherein the the first portion of the main data encoded with symbols having bypass levels is not mapped to extended levels.

3. The method of claim 1, wherein the mapping the second portion of the main data symbols to extended levels by applying modulation values of the additional data includes
    mapping the main data symbols to the extended levels when the applied modulation values of the additional data have a first modulation value, and
    maintaining the levels of the main data symbols when the applied modulation values of the additional data have a second modulation value.

4. The method of claim 1, further comprising:
    error correction encoding the additional data; and
    BPSK modulating the error correction encoded signals.

5. A method for receiving broadcast data including main data and additional data in a digital broadcasting system, comprising:
    receiving from a transmitting antenna a broadcast data encoded with symbols having a plurality of levels, wherein the plurality of levels includes extended levels, and wherein the broadcast data includes a main data and an additional data;
    dividing the broadcast data into a first portion of the broadcast data having bypass levels and a second portion of the broadcast data;
    deciding whether the second portion of the broadcast data includes data mapped to extended levels;
    differentiating the levels of the second portion of the broadcast data; and
    outputting modulation values for the additional data based on the levels of the second broadcast data.

6. The method of claim 5, further comprising maintaining the levels of the first portion of the broadcast data having bypass levels.

7. The method of claim 5, wherein the outputting of the modulation values includes
    outputting a first modulation value of the additional data when the level of the second portion of the broadcast data exceeds a threshold value; and
    outputting a second modulation value of the additional data when the level of the second portion of the broadcast data is less than the threshold value.

8. The method of claim 7, further comprising converting the levels of the second portion of the broadcast data to main data levels before the broadcast data symbols are outputted to the decoder of the main data.

9. The method of claim 5, further comprising:
    performing BPSK demodulation on the modulation values; and
    performing error correction decoding on the demodulated signals to receive the additional data;
    wherein the modulation values of the additional data are BPSK signals.

10. An apparatus for transmitting broadcast data in a digital broadcast system,
    comprising: a transmitter for transmitting broadcast data including a main data and an additional data, wherein the transmitter includes a detector configured to decide whether levels of the main data encoded with symbols having a plurality of levels belong to a first portion of the main data having bypass levels or a second portion of the main data; and
    a mapper configured to map the main data symbols of the second portion of the main data to extended levels by using modulation values of the additional data.

11. the apparatus of claim 10, wherein the transmitter further includes a bypass unit maintaining the levels of the first portion of the main data symbols.

12. The apparatus of claim 10, wherein the mapper is further configured to map a level of the second portion of the main data to an extended level when the modulation value of the additional data has a first figure and maintaining a level of the main data when the modulation value of the additional data has a second figure.

13. the apparatus of claim 10, wherein the transmitter further includes:
   an error correction decoder configured to perform error correction decoding on the additional data; and
   a BPSK modulator configured to perform BPSK modulation on the error correction decoded signals.

14. An apparatus for receiving broadcast data in a digital broadcasting system,
   comprising: a receiver for receiving from an antenna broadcast data including a main data and an additional data, wherein the receiver includes a detector configured to decide
      whether a broadcast data encoded with symbols having a plurality of levels may be divided into a first portion of the broadcast data having bypass levels and a second portion of the broadcast data, and
      whether the second portion of the broadcast data includes data mapped to extended levels; and
   a demapper configured to output modulation values of the additional data based on the levels of the second broadcast data.

15. the apparatus of claim 14, wherein the receiver further includes a bypass unit maintaining the levels of the first portion of the broadcast data having bypass levels.

16. The apparatus of claim 14, wherein the demapper is further configured to output
   a first modulation value of the additional data when the level of the second portion of the broadcast data exceeds a threshold value, and
   a second modulation value of the additional data when the level of the second portion of the broadcast data is less than the threshold value.

17. the apparatus of claim 16, wherein the receiver further includes a converter configured to convert the levels of the second portion of the broadcast data symbols to main data levels.

18. the apparatus of claim 14, wherein the receiver further includes a BPSK demodulator configured to perform
   BPSK demodulation on the modulation values; and
   an error correction decoder configured to perform error correction decoding on the demodulated signals,
   wherein the modulation values of the additional data are BPSK signals.

* * * * *